United States Patent [19]
Cantor et al.

[11] Patent Number: 5,553,924
[45] Date of Patent: Sep. 10, 1996

[54] VEHICLE SAFETY SEAT SYSTEM

[75] Inventors: Alan E. Cantor, Ivyland, Pa.; William H. Muzzy, III, Slidell, La.; Donald K. Eisentraut, Kintnersville, Pa.; Louis A. D'Aulerio, Horsham, Pa.; Gary R. Whitman, Jamison, Pa.

[73] Assignee: The Board of Trustees of the University of Alabama for its division, The University of Alabama at Birmingham, Birmingham, Ala.

[21] Appl. No.: 339,859

[22] Filed: Nov. 15, 1994

[51] Int. Cl.⁶ .................................................. A47C 7/18
[52] U.S. Cl. .................. 297/452.27; 297/452.55; 297/DIG. 1
[58] Field of Search .................. 297/452.27, 452.55, 297/DIG. 1, 480; 280/806; 180/282; 5/464

[56]           References Cited

U.S. PATENT DOCUMENTS

| | | | |
|---|---|---|---|
| 3,612,607 | 10/1971 | Lohr . | |
| 3,833,259 | 9/1974 | Pershing . | |
| 3,918,545 | 11/1975 | Andres et al. | 297/480 |
| 4,671,534 | 6/1987 | Yano | 180/282 |
| 4,726,086 | 2/1988 | McEvoy | 5/464 |
| 4,755,411 | 7/1988 | Wing et al. | 428/71 |
| 4,784,437 | 11/1988 | Shimada . | |
| 4,837,881 | 6/1989 | Kondo et al. | 5/464 |
| 5,085,487 | 2/1992 | Weingartner et al. . | |
| 5,186,494 | 2/1993 | Shimose | 280/806 |
| 5,269,590 | 12/1993 | Carilli | 297/452.55 |
| 5,332,262 | 7/1994 | Chou | 297/480 |

OTHER PUBLICATIONS

"Confor™ Ergonomic Urethane Foams," *Technical Data Sheet TDS–13*, E-A-R Specialty Composites, Division Cabot Safety Corporation, 7911 Zionsville Road, Indianapolis, IN 46268 (7 pages), ©1986, Specialty Composites Corporation.

"Modified Polyurethane Foam's Slow Recovery Protects Astronauts," *Design News*/Feb. 18, 1985, pp. 150, 151.

"'Ergonomic' foam keeps aircrews flying longer," *Design News*/Sep. 5, 1988, p. 43.

*Primary Examiner*—Peter M. Cuomo
*Assistant Examiner*—Anthony D. Barfield
*Attorney, Agent, or Firm*—Gifford, Krass, Groh, Sprinkle, Patmore, Anderson & Citkowski, P.C.

[57]           ABSTRACT

A vehicle safety seat system includes a contoured vehicle seat bottom and a foam layer disposed over the supporting vehicle seat bottom and supported by the supporting vehicle seat bottom. The foam layer has a rate sensitive compression characteristic. The rate sensitive compression characteristic is a compressive response to a slow application and a rigid response to a rapid application of force. To adapt an existing seat bucket to the desired configuration, a rigid foam layer may be molded within the supporting vehicle seat bottom. This rigid foam layer is contoured and disposed at an angle with respect to the horizontal. Seat belts having a pretensioner device are also provided. The pretensioner device is controlled according to both a frontal crash sensor and a vehicle-off ground control system to couple occupant to the seat bottom prior to a wheels first landing.

28 Claims, 1 Drawing Sheet

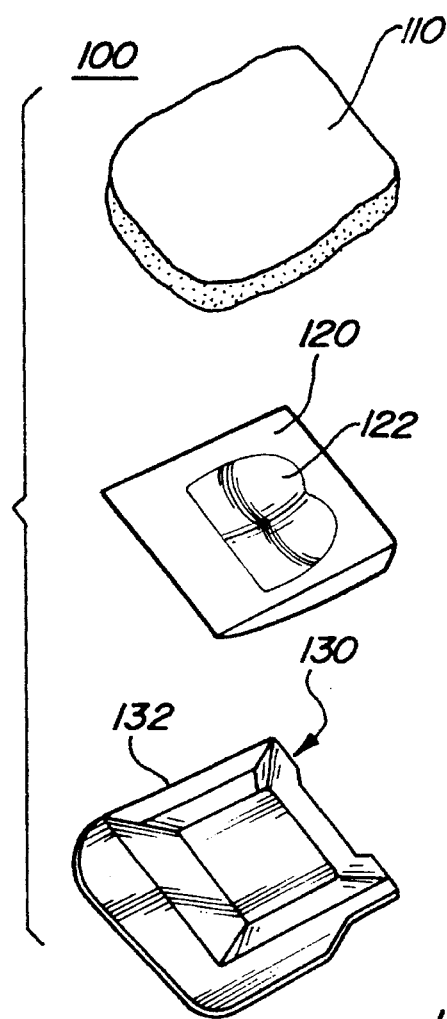
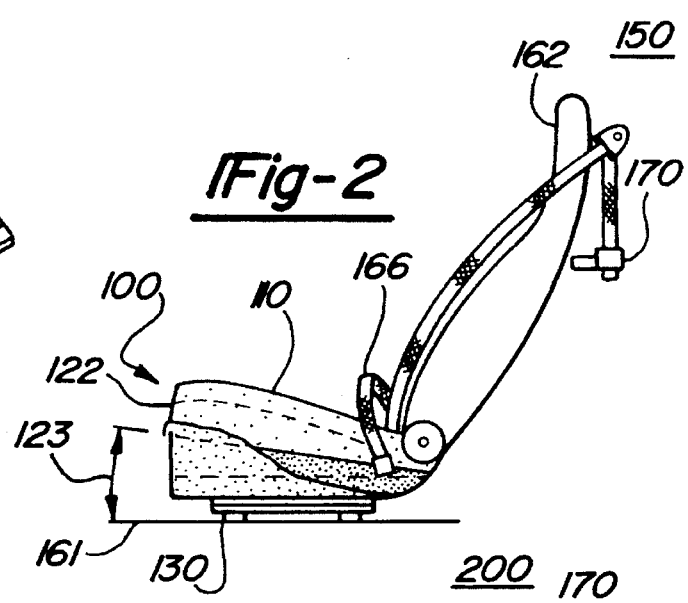
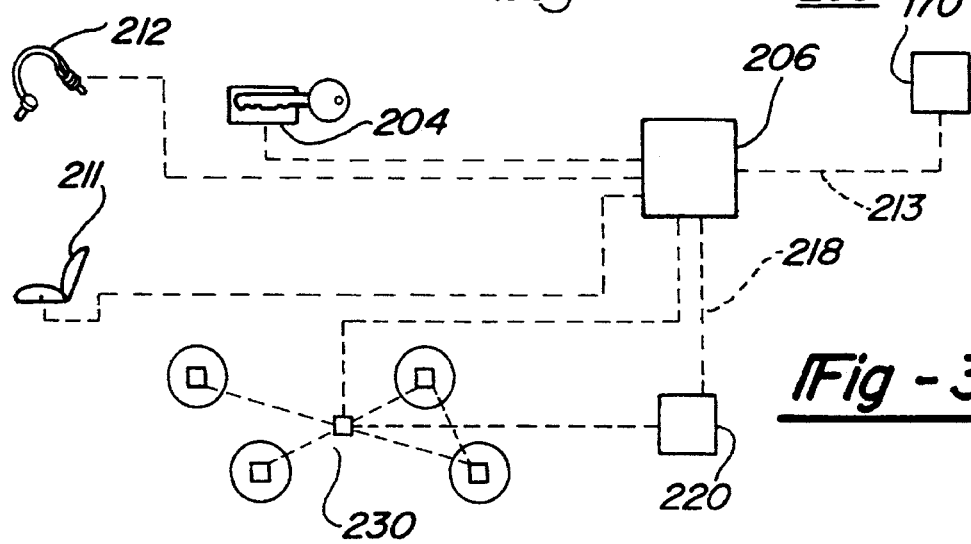

VEHICLE SAFETY SEAT SYSTEM

BACKGROUND OF THE INVENTION

The present invention relates generally to vehicle safety equipment, and, in particular, to safety equipment protecting occupants of a vehicle from injury during a wheels-first crash.

The purpose of occupant restraint systems in motor vehicles is the protection of occupants to increase their survival probability during crash impact of the vehicles. Occupant restraint systems perform three basic functions in order to achieve this: the prevention of occupant ejection from the vehicle, the prevention or minimization of the effects of secondary collisions such as impacts with interior vehicular structures and the control of the crash forces applied to the occupant. Known occupant restraint devices such as three-point lap and shoulder harnesses which perform these functions have been widely researched and improved over the years, thereby significantly increasing automotive safety.

However, attention to the seating portion of automotive restraint systems has not been as extensive. One concern in the area of the seating portion of these systems is that the design of many contemporary automotive seat bottoms have compliant characteristics during vertical loading, +Gz, wherein +Gz is understood to be the upward spinal loading for human occupants of the seats of the type which may occur when an automobile becomes airborne and then lands wheels first. Compliant seating characteristics tend to produce excessive occupant displacements during impulsive loading thereby exposing the occupant to structural strike hazards and offering little management of the crash impact energy.

Hodgson, V. R., Lissner, H. R. and Patrick, I. M., "Response of the Seated Human Cadaver to Acceleration and Jerk With and Without Seat Cushions", The Journal of the Human Factors Society, 1963, disclosed a study with human cadavers during vertical loading. The study concluded that the dynamic load factor, or dynamic overshoot, was increased by all types of cushions used in the tests. The report also concluded that the use of a soft cushion which bottoms during an impulsive force causes more overshoot than the use of no cushion at all. However, soft cushions continue to be used because of perceived occupant comfort in prior art automotive seat cushion technology.

Military technologists have expended considerable effort researching the problem of +Gz exposure, both in the ejection seat and crash-resistant seat areas. This +Gz force vector is an important factor in many occupant survival considerations in military vehicles. For example, helicopter occupants experience significant +Gz acceleration during crashes and hard landings. Ejection seat occupants also experience significant +Gz accelerations as the seat is rapidly propelled from the aircraft.

Military experiments on ejection and helicopter seats have demonstrated that a contoured non-compressible seat pan covered with a rate-dependent foam cushion provides reasonable occupant response by minimizing displacement of the occupant under load. Displacement-controlling seat bottoms define occupant kinematics in a predictable manner. This enables designers to identify potential structural strike hazards and to protect the seat occupant from them. This type of seat bottom prevents occupant response from exhibiting excessive dynamic overshoot.

Human tolerance to +Gz loading may be expressed in terms of both amplitude and time duration. This loading data is commonly reported as Eiband Curves. Using this method of characterization a level of 23 G over approximately a time duration of 5.5 milliseconds has been identified as a critical transition point for the threshold injury region for the human spine. See, for example, Eiband, A. Martin, 1959, Human Tolerance to Rapidly Applied Accelerations: A Summary of the Literature, National Aeronautics and Space Administration, Washington. Subsequent investigation by military researchers in the development of ejection seat designs essentially substantiated the data published by Eiband.

However, it is generally accepted that these tolerance values are based on healthy young males who are ideally positioned with the mid-axillary line of the spine parallel to the acceleration vector. Researchers agree that departure from ideal prepositioning or ideal physiology of the seated occupant tends to lower the ability of the spine to tolerate +Gz loading without serious injury.

Consequently, occupant characteristics such as age, sex, bone strength, and initial position all influence occupant response to impulsive acceleration loading. These factors may increase the likelihood of serious spinal injury even at force levels substantially below the 23 G level set forth by Eiband. As a result of these variables researchers have attempted to define a risk regime of +Gz exposures where extreme caution must be taken to avoid spinal injuries.

Standard military protocol for testing human subjects to +Gz generally permits initial exposure at a safe level of 6 G for training and indoctrination purposes. Acceleration is then gradually increased in 1 G to 2 G increments, using the 8 G through 10 G levels to study kinematic motions. Higher levels, for example, 12 G and beyond, define the risk range. In this protocol, exposure to this risk range is undertaken only after careful analysis of occupant response to accelerations in the safe range.

The close relationship between the safe range and the risk range on the +Gz axis has necessitated careful control of dynamic overshoot within military seating systems in order to prevent avoidable and unnecessary increase of exposure in the risk range. This principle is directly applicable to all vehicles that experience a +Gz acceleration.

Automobile seat designers typically use several different seat bottom design approaches which are very different from the military approach. Some automobile seats contain varied thicknesses of padding material integrated with an array of springs and positioned over an open space within a seat cushion frame. Other designs use thick layers of similar padding material mounted within a rigid seat bottom structure. Still other designs use a hybrid of cushion foams and structures in forming the automotive seat.

It is well known in the field of vehicle safety to provide seat belt restraints for occupants of automobile seats. It is also well known to provide pretensioner devices for eliminating slack in seat belt restraints in order to ideally position occupants including coupling the occupants of the seats with the seat cushions. Conventional pretensioners operate by using well known sensing devices which sense a crash using front crash sensors.

The present invention comprises an automobile safety seat system which has been designed to provide protection from upward force along the spinal column of an occupant of the seat. This is the kind of force applied to an occupant in a wheels-first automobile crash such as a crash into a ditch. The seat bottom of the safety seat system includes a metal automobile seat bucket enclosed on the bottom.

The seat bucket of the present invention is formed to provide a finished undersurface which is covered with an energy absorbing foam. The undersurface includes an overall contour and a definitive anti-submarining ramp for reaction of the buttocks during certain types of collisions. The ramp and underseat construction should be tailored and tuned to each individual automobile station in which they are used. A starting region for such a point design may be the following characteristics: The overall slope angle from front to rear should be a gently contoured angle of approximately fifteen degrees for the first portion of the seat bottom tapering to approximately ten degrees at the back of the seat bottom when completely covered with foam. The ramp structure itself should be a localized angle of approximately thirty degrees assuming a seat front to rear dimension of approximately eighteen inches. A starting location for the ramp may be approximately nine inches from the rear of the seating surface. This would be one of the areas that would need to be specifically tuned for the vehicle.

The seat bucket understructure may be formed of sheet material specifically contoured to the individual application, or it can be made from a generic seat bottom bucket that is filled with a rigid foam insert that is then shaped to the desired contour. For the latter method the seat bucket is filled with a liquid foaming material in order to fill all voids within the seat bucket and to form a bottom cushion which tightly fits within and conforms to the seat bucket. After the liquid foaming material hardens it is either contoured to the buttocks of an idealized occupant and disposed at a ramp angle compatible with the automobile being outfitted or pre-molded to such a shape.

The understructure is then covered with a two-inch layer of environmentally covered energy absorbing foam. The covering layer is a medium density open cell foam which is disposed over any structures in the occupant contact region of the seat in order to further protect the occupant from the covered structures. The covering foam layer is a rate sensitive foam which is easily compressible when force is applied to it slowly and substantially rigid when force is applied to it quickly, for example, during a hard impact. This permits both the comfort required by consumers of automotive products and the advantageous force transmission properties of a more rigid seating surface. Between the fabric and the energy absorbing foam a closed cell comfort pad of a thickness of about one inch may be placed between the rate sensitive foam and the cover. The seat belts of the automobile seat are attached to the seat bottom as close as practical to the intersection between the occupant compressed seat back and the occupant compressed seat bottom in order to control buttocks angulation during unloading events and to aid in keeping the buttocks coupled to the seat. In order for the seat bottom to provide effective dynamic overshoot control in the preferred embodiment of the invention, the seat belt includes a pretensioner. The pretensioner which activates prior to a wheels-first landing applies pre-impact tension to the seat belt in order to prevent slack in the lap region and thereby further improve occupant coupling with the seat cushion. The combination of the belt mounting and the pretensioner help the buttocks of the occupant remain applied to the seat bottom cushion prior to and during the landing of the wheels in the event of a wheel-first crash. The mounting location of the seat belt controls angulation of the belt and ensures that a snug belt maintains the buttocks against the seat cushion when properly angulated. It also helps to maintain the seat belt on the pelvis of the occupant during a variety of other types of crashes. The pretensioner of the prior art responds primarily to a frontal crash sensor. With this invention, the pretensioner also activates when an additional vehicle off-ground sensor indicates that the vehicle containing the inventive seat system is airborne. The vehicle off-ground sensor operates by detecting unweighting of the wheels. Triggering is buffered to prevent inadvertent actuation of the pretensioner during maintenance and lifting of the automobile.

SUMMARY OF THE INVENTION

Briefly stated, the present invention comprises a vehicle safety seat system including a supporting vehicle seat bottom and a first energy absorbing foam layer disposed over the seat bottom and supported by the seat bottom. A second foam layer is disposed over the first energy absorbing foam layer. The second foam layer has a rate sensitive compression characteristic.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 1 is an exploded perspective view of the vehicle safety seat of the vehicle safety seat system of the present invention;

FIG. 2 is a side view of the vehicle safety seat of the vehicle safety seat system of the present invention; and FIG. 3 is a block diagram representation of the control system function of vehicle safety seat system of the present invention.

DETAILED DESCRIPTION OF PREFERRED EMBODIMENTS

Referring to the drawings, wherein the same reference numerals are used to designate the same elements throughout, there are shown in FIGS. 1 and 2 an exploded perspective view of the vehicle safety seat 100 and a side view of the vehicle safety seat system 150 of the present invention. The vehicle safety seat 100 includes a supporting vehicle seat bottom 130. The vehicle supporting seat bottom 130 may be a conventional bucket seat which is formed of a structural material such as metal. A bottom foam layer 120 may be disposed within the vehicle supporting seat bottom 130 and supported by the supporting seat bottom 130. A top foam layer 110 is disposed above the seat bottom 120. The top foam layer 110 is adapted to have a rate sensitive compression characteristic. The rate sensitive compression characteristic is such that it presents a compressive response to a slow application of force and a rigid response to a rapid application of force such as the force applied to the top foam layer 110 during an impact.

A generic bucket or an adaptation of an existing seat bucket may be used to form the bottom foam layer 120. This may be accomplished by pouring a liquid foaming material into the supporting seat bottom 130 or a predefined mold taking care to prevent the formation of voids. Filling the bottom 130 which is relatively deep in this manner up to the beginning of the ramp forms a moldable rigid foam underlayer that provides a firm and stable surface upon which top foam layer 110 may be disposed. Any voids inadvertently formed within the liquid foaming should be removed. Prevention of voids provides improved force transmission characteristics. A liquid foaming material suitable for the purpose of forming the bottom foam layer 120 is a rigidized foam of the polyurethane type. In an alternate embodiment the bottom 130 may be filled up to the lip 132.

In addition to providing a force transmission medium free of voids, the pouring of the liquid foaming material into the seat bottom 130 provides a bottom foam layer 120 which fits tightly within the supporting seat bottom 130. This tight fit also assists in the proper transmission of upward forces through the bottom foam layer 120.

When the bottom foam layer 120 hardens a seat contour 122 is formed upon the upper surface of the bottom foam layer 120. The seat contour 122 is adapted to conform to the buttocks of an idealized seat occupant. In the preferred embodiment of the vehicle safety seat 100, the seat contour 122 conforms to the tuberosities of a fiftieth percentile idealized male occupant. In the preferred embodiment, the seat contour 122 is ramped in order to dispose the occupant at an angle 123 offset from the horizontal. This ramp angle 123 may be twenty-five to thirty degrees. Additionally, the top surface of top foam layer 110 may be inclined at ten degrees in the front region and fifteen degrees in the rear region. Forming the top foam layer 110 at these angles provides a further restraining function for restraining movement of the occupant of the vehicle safety seat system 150 during an impact.

The top foam layer 110 is disposed over the contoured seat bucket or the bottom foam layer 120 having the seat contour 122 in a manner which ensures that all loading of upward forces transmitted to the occupant of the vehicle safety seat 100 is done by way of the top foam layer 110. Thus all hard objects, including the seat bottom upper lip 132 of the supporting seat bottom 130, are covered by the top foam layer 110. When the safety seat 100 is combined with a seat back 162, the top foam layer 110 also extends under the seat back 162. The thickness of the top foam layer 110 may be approximately two inches.

Although any rate sensitive foam having the required compressive characteristic may be used to form the top foam layer 110 of the vehicle safety seat 100, rate sensitive foams such as the conventional CONFOR™ foams are used in the preferred embodiment. These foams protect the occupant from vertical loading by reducing dynamic overshoot. They are open celled polyurethane foams having a rate sensitive property providing them with high energy absorbing properties. CONFOR™ foams and similar products exhibit low compression set for their low rebound, highly damped properties. This compression set permits loading up to and above fifty percent compression. Additionally, their low impact resilience provides good energy absorption. The energy absorption may be up to ninety-seven percent without bottoming out with little absorbed energy being returned to the impacting object.

When the top foam layer 110 is formed of such a rate sensitive material it retains the shape of a depressing object when it returns to its original height if it is deformed slowly. Additionally, it softens when exposed to body temperature for a period of time. Both of these characteristics cause it to conform closely to the shape of the occupant of the vehicle safety seat system 150. This conformability allows the layer 110 to distribute weight of the occupant and transmit force of an impact more evenly.

It will be understood that by those skilled in the art that the top foam layer 110 may be formed of a foam having a variable modulus of elasticity. For example, the top foam layer 110 may be formed of a foam material wherein the variable modulus of elasticity is a dual modulus of elasticity.

The vehicle safety system seat 150 includes a conventional seat belt 166 with a pretensioner device 170. The lap portion of the seat belt 166 is attached to the vehicle safety seat 100 as close as practical to the union of the occupant compressed seat back 162 and the occupant compressed vehicle safety seat 100. This assists in the control of the angulation of the buttocks of the occupant during unloading events. It also improves occupant crash protection during the roof impact portion of a vehicle rollover by minimizing occupant travel towards the roof of the vehicle.

Referring to FIG. 3, there is shown a block diagram representation of the pretensioner control system 200 of the vehicle safety seat system 150 of the present invention. The pretensioner control system 200 includes the pretensioner device 170. The pretensioner device 170 is activated when a vehicle leaves the ground while in motion, thus indicating a potential vertical load or a rollover event. The pretensioner device 170 is a conventional pretensioner which is activated in response to a control signal applied to it by way of the control line 213. The control signal of the control line 213 is provided by the pretensioner system controller 206 in response to signals from the ignition switch 204, the seat occupied sensor 211, the belt buckle sensor 212, the rolling wheel sensors 230 and the suspension position sensor 220. The use of these signals is effective to prevent non-accident off-ground occurrences from activating the pretensioner device 170.

The suspension position sensor 220 requires both an arming event and a trigger event in order to apply an off-ground control signal to the pretensioner controller 206 by way of the control line 218. The arming event of the suspension position sensor 220 is the rolling of all four wheels of the vehicle containing the vehicle safety seat system 150. This event occurs during both a wheels-first crash and a roof-first crash. Rolling of the wheels of the vehicle is detected by the rolling wheel sensor 230. When the vehicle ignition 204 is on and the vehicle starts to move, the sensor 220 arms. This prevents inadvertent actuation in the event of jacking or lifting of the car. Thus, the vehicle must first be started and in motion for the pretensioner device 170 to be activated in a crash. The event required to trigger the sensor is the unloading of the vehicle by the wheels leaving the ground in any one of five possible combinations: Left front/right front; left rear/right rear; left front/left rear; right front/right rear; or all four wheels simultaneously leaving the ground.

In order to compare the vehicle safety seat system 150 with prior art vehicle seats (not shown) a hyge sled experiment was conducted. The hyge sled experiment was performed upon several different test seats in order to evaluate their dynamic performance under controlled laboratory conditions. The tests were performed without the pretensioner device 170 or the seat belt attachment. In particular, spinal loading of occupants of the test seats during sudden upward acceleration was evaluated in the sled experiment.

Several prior art automobile seats were included in the test seats of the experiment. They were conventional automobile production seats formed as four different construction types: a full size sedan seat, a compact sports coupe seat, a passenger van seat and a compact import sedan seat. The sled experiment also included one baseline rigid automobile seat which was used as a control. Additionally, one energy managing seat bottom such as the vehicle safety seat 100 of the vehicle safety seat system 150 was included in the sled experiment.

Test variables such as test dummy size, weight, test dummy initial position, crash pulse peak accelerations and velocity changes were controlled in the experiment in order to determine their influence on occupants of the different test seats. It was demonstrated in this experiment that significant dynamic amplification of +Gz crash forces was experienced by occupants seated in the conventional production test seats. This amplification of crash forces was observed even when the test seats were subjected to input energy levels within a relatively benign range of wheel-first impacts. However, using the vehicle safety seat 100 of the present invention the potentially injurious spinal accelerations and force loads generated by the production automotive-type cushions were prevented and the +Gz forces were reduced to non-injurious levels. Details of these tests are set forth in Occupant Dynamic Response to Vertical Acceleration (+Gz) with Automotive Seating by Alan E. Cantor et al. which is attached as an appendix.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A vehicle safety seat system for protecting an occupant of a vehicle from injury, said vehicle safety seat comprising:
   a supporting vehicle seat bottom;
   a first foam layer disposed over said supporting vehicle seat bottom and supported by said supporting vehicle seat bottom, said first foam layer configured to support the occupant's buttocks;
   a second foam layer disposed over said first foam layer, said second foam layer having a rate sensitive compression characteristic, said rate sensitive compression characteristic comprising a compressive response to a slow application of force and a rigid response to a rapid application of force;
   a vehicle off-ground sensor adapted to detect at least one wheel leaving the ground in a crash situation; and
   an occupant restraint having a pretensioner device, said pretensioner device adapted to activate in response to said vehicle off-ground sensor, said occupant restraint positioned for retaining the buttocks on said first foam layer upon activation of said pretensioner.

2. The vehicle safety seat system according to claim 1, wherein said rate sensitive compression characteristic comprises a compressive response to a slow application of force and a rigid response to a rapid application of force.

3. The vehicle safety seat system according to claim 1, wherein said first foam layer comprises a molded foam layer.

4. The vehicle safety seat system according to claim 3, wherein said molded foam layer is formed of a hardened liquid foaming material.

5. The vehicle safety seat system according to claim 4, wherein said supporting vehicle seat bottom is an enclosed seat bottom and said hardened liquid foaming material is disposed within said enclosed seat bottom.

6. The vehicle safety seat system according to claim 5, wherein voids are eliminated from said liquid foaming material within said enclosed seat bottom prior to hardening of said liquid foaming material.

7. The vehicle safety seat system according to claim 5, wherein said enclosed seat bottom is formed of metal.

8. The vehicle safety seat system according to claim 3, wherein a surface of said molded foam layer is provided with a contour to form a contoured layer.

9. The vehicle safety seat system according to claim 8, wherein said contour is disposed at an angle with respect to horizontal.

10. The vehicle safety seat system according to claim 9, wherein said angle is approximately fifteen degrees.

11. The vehicle safety seat system according to claim 1, further comprising an occupant restraint having a pretensioner device.

12. The vehicle safety seat system according to claim 11, including a frontal crash sensor wherein said pretensioner device is activated in accordance with said frontal crash sensor.

13. The vehicle safety seat system according to claim 12, including a vehicle off-ground sensor, wherein said pretensioner device is activated in accordance with said vehicle off-ground sensor.

14. The vehicle safety seat system according to claim 13, wherein said vehicle off-ground sensor comprises a rolling wheel sensor.

15. The vehicle safety seat system according to claim 14, wherein said vehicle off-ground sensor comprises a suspension position sensor.

16. The vehicle safety seat system according to claim 1, wherein said supporting vehicle bottom has a seat bottom upper lip and said second foam layer is disposed over said seat bottom upper lip.

17. A method of minimizing vertical forces applied to the spine of an occupant of a vehicle safety seat system during impact of a vehicle for protecting said occupant of said vehicle safety seat system from injury, comprising the steps of:
   applying said force to said occupant by way of a first foam layer disposed over a supporting vehicle seat bottom and supported by said supporting vehicle seat bottom said first foam layer configured to support the occupant's buttocks, and a second foam layer disposed over said first foam layer wherein said second foam layer has a rate sensitive compression characteristic, said rate sensitive compression characteristic comprising a compressive response to a slow application of force and a rigid response to a rapid application of force;
   securing said occupant against said first foam layer by means of an occupant restraint having a pretensioner device; and
   activating said pretensioner by means of a vehicle off-ground sensor adapted to detect at least one wheel leaving the ground in a crash situation.

18. The method of minimizing vertical forces applied to the spine of an occupant of a vehicle safety seat system according to claim 17, wherein said rate sensitive compression characteristic comprises a compressive response to a slow application of force and a rigid response to a rapid application of force.

19. The method of minimizing vertical forces applied to the spine of an occupant of a vehicle safety seat system according to claim 17, wherein said first foam layer comprises a molded foam layer.

20. The method of minimizing vertical forces applied to the spine of an occupant of a vehicle safety seat system according to claim 17, comprising the step of forming said molded foam layer of a hardened liquid foaming material and eliminating voids from said liquid foaming material prior to hardening of said liquid foaming material.

21. The method of minimizing vertical forces applied to the spine of an occupant of a vehicle safety seat system according to claim 20, wherein said supporting vehicle seat bottom is an enclosed seat bottom and said hardened liquid foaming material is disposed within said enclosed seat bottom.

22. The method of minimizing vertical forces applied to the spine of an occupant of a vehicle safety seat system according to claim 17, comprising the step of urging said occupant against said first foam layer prior to said impact.

23. The method of minimizing vertical forces applied to the spine of an occupant of a vehicle safety seat system according to claim 22, comprising the step of securing said occupant against said first foam layer.

24. The method of minimizing vertical forces applied to the spine of an occupant of a vehicle safety seat system according to claim 23, comprising the step of securing said occupant against said first foam layer by means of a pretensioner device.

25. The method of minimizing vertical forces applied to the spine of an occupant of a vehicle safety seat system according to claim 24, comprising the step of activating said pretensioner device in accordance with a frontal crash sensor.

26. The method of minimizing vertical forces applied to the spine of an occupant of a vehicle safety seat system according to claim 25, comprising the step of activating said pretensioner device in accordance with a vehicle off-ground sensor.

27. The method of minimizing vertical forces applied to the spine of an occupant of a vehicle safety seat system according to claim 26, wherein said vehicle off-ground sensor comprises a rolling wheel sensor.

28. The method of minimizing vertical forces applied to the spine of an occupant of a vehicle safety seat system according to claim 27, wherein said vehicle off-ground sensor comprises a suspension position sensor.

* * * * *